Dec. 29, 1953 W. A. RAY 2,664,103
HANDLE CONNECTION FOR PLUG VALVES
Filed Aug. 4, 1951 2 Sheets-Sheet 1
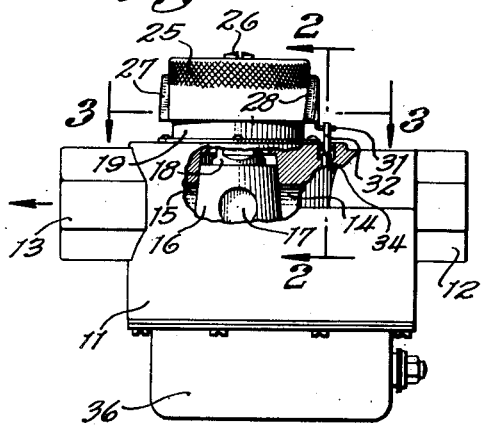
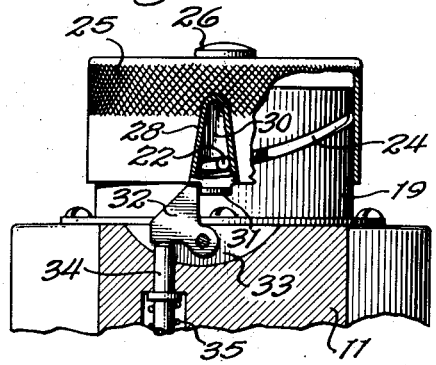
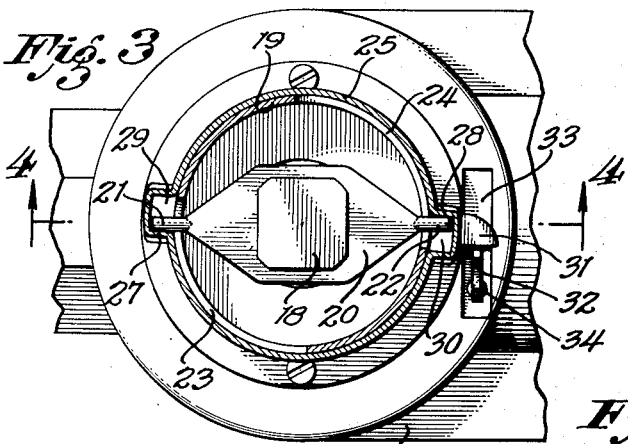
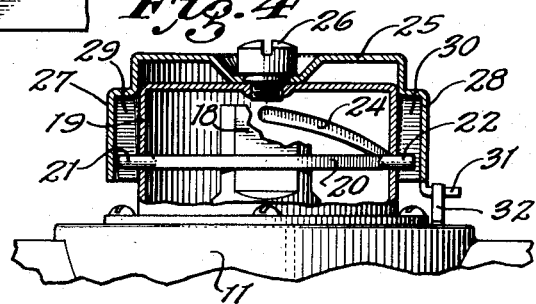
Inventor,
WILLIAM A. RAY
By
John H. Rouse,
Attorney Dec. 29, 1953 W. A. RAY 2,664,103
HANDLE CONNECTION FOR PLUG VALVES
Filed Aug. 4, 1951 2 Sheets-Sheet 2
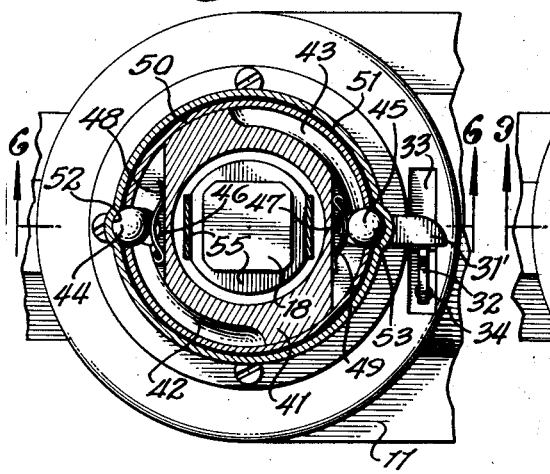
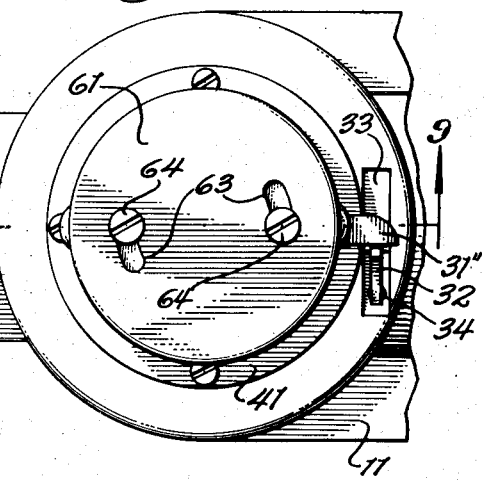
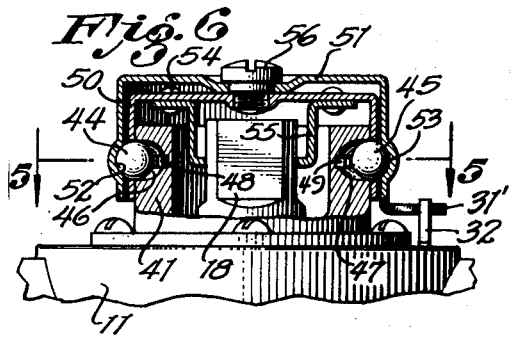
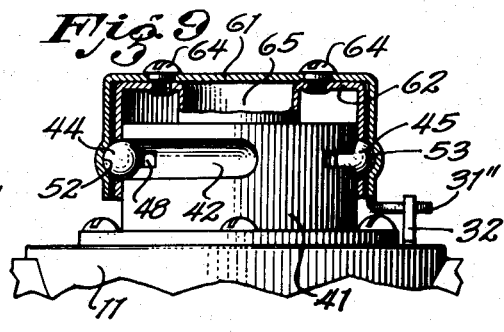
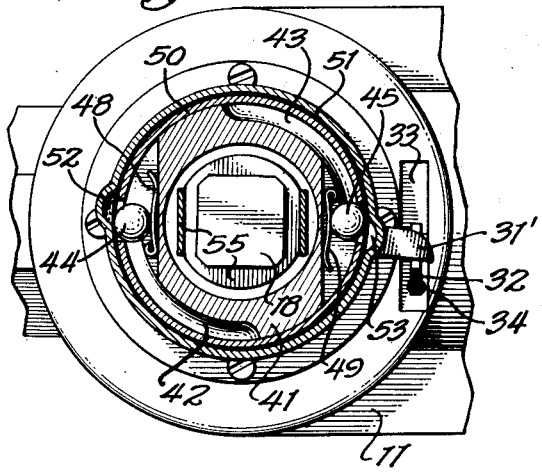
Inventor,
WILLIAM A. RAY
By John H. Rouse,
Attorney Patented Dec. 29, 1953

2,664,103

UNITED STATES PATENT OFFICE 2,664,103

HANDLE CONNECTION FOR PLUG VALVES

William A. Ray, North Hollywood, Calif., assignor to General Controls Co., Glendale, Calif., a corporation of California Application August 4, 1951, Serial No. 240,305

7 Claims. (Cl. 137—560)

This invention relates to control apparatus which includes (1) a valve of the rotatable-plug type for controlling flow of fluid such as fuel-gas, (2) an additional control device such as a safety shut-off valve, pilot-burner valve, or gas igniter, (3) a common handle for rotating the plug-valve and for actuating the additional control device when the plug is in a given flow-controlling position, and (4) means forming a lost-motion connection between the handle and the plug for preventing the possibility of the additional control device being frictionally held in the position to which it is actuated by the handle—as, if the connection between the handle and the plug were a rigid one, might occur because of the high degree of friction inherent in a plug valve. This general combination was first disclosed by me in Patent No. 2,257,024, and subsequently in various other patents such as No. 2,313,890, No. 2,447,207 and No. 2,472,384, and in my copending application Serial No. 669,037 filed May 11, 1946, and issued September 4, 1951, as Patent No. 2,566,372.

It is essential that lost-motion be permitted between the handle and the plug when the handle is in or near its position for actuating the additional control device since, in most intended applications of the control apparatus, a dangerous condition might be established if the additional control device were frictionally held in actuated position; but the lost-motion has no value, and may be objectionable, when the handle is in other operative positions.

It is therefore an object of this invention to provide an arrangement wherein the amount of lost-motion between the handle and the plug is automatically reduced, or substantially eliminated, when the handle and plug are turned to positions other than those in which the lost-motion is desirable.

For full understanding of the invention, and further appreciation of its features and advantages, reference is to be had to the following detailed description and accompanying drawing, and to the appended claims.

In the drawing:

Figure 1 is a side elevation, partly broken away to show internal parts, of a control structure embodying features of this invention;

Figure 2 is a fragmentary vertical section, to enlarged scale, taken generally along the line 2—2 of Fig. 1;

Figure 3 is an enlarged horizontal section taken along the line 3—3 of Fig. 1;

Figure 4 is a vertical section taken along the line 4—4 of Fig. 3;

Figures 5 and 6 are views, corresponding respectively to Figs. 3 and 4, of a modified form of the invention; Figure 7 being a view of the structure as shown in Fig. 5 but with the parts in moved positions; and Figures 8 and 9 are views, in plan and in broken side-elevation, respectively, of a control structure whose operation is the same as that of the structure shown in Figs. 5–7, but whose handle 61 is attached in a different manner.

Referring now more particularly to Figs. 1–4, the numeral 11 indicates a valve casing having inlet and outlet connections 12 and 13 for aligned inlet and outlet passages 14 and 15, respectively; communication between which passages is controlled by a tapered plug 16 seated in a correspondingly tapered opening in the casing and having a transverse opening 17 registerable with those passages when the plug is rotated through 90° from its closed position as shown in the figures. The plug 16 has at its top an integral stem 18, generally square in cross-section, which projects through an opening in the top of the casing covered by a hollow cap 19 secured to the casing. Within this cap is a plate 20 having a central opening conforming freely to the shape of the plug-stem 18 and receiving the same. At its opposite ends the plate 20 is formed to provide cylindrical tips 21, 22 which project through slots 23, 24 in the side wall of cap 19; these slots extending helically, so that with rotation of the plug 16 the plate 20 rises or falls on the stem of the plug.

Around the upper part of cap 19 is an inverted cup 25 which is rotatably mounted on the cap by a shouldered screw 26; the side wall of cup 25 being provided with a pair of hollow vertical ribs 27, 28, the interiors of which form recesses 29, 30 for the tips 21, 22 of plate 20. At their lower ends the recesses 29, 30 are wide in relation to the tips 21, 22 so that the cup 25 can be rotated in counterclockwise direction (as viewed from the top) through about 9° from its position as shown in the drawing before the tips 21, 22 are engaged by the opposite sides of the recesses.

Continued counterclockwise rotation of the cup or handle 25 effects, through the plate 20, rotation of the plug 16; the plate rising on stem 18 in this operation so that when the plug reaches a position 90° from that shown the tips 21, 22 are at the high ends of the slots 23, 24 and at the upper ends of the recesses 29, 30 where the same are only slightly wider than the tips.

The arrangement just described constitutes a variable lost-motion connection between the handle 25 and plug 16 whereby the amount of lost-motion is made relatively large when the parts are in the positions shown in the drawing, but is reduced to a negligible amount when the handle and plug are rotated counterclockwise through 90° to effect closing of the plug valve.

Projecting outwardly from the rib 23 of handle 25 is a finger 31 which is adapted, upon slight clockwise rotation of the handle, to engage a bell-crank 32 pivotally mounted in a recess 33 in the top of casing 11 and resting on the top of a rod 34 reciprocable in an opening in the casing and biased upwardly by a spring 35.

At the interior of the casing the rod 34 may be operatively connected to an additional control device such as a safety shut-off valve controlling the whole flow through the casing and normally maintained in open position by electromagnetic means within a housing 36 shown on the bottom of the casing in Fig. 1; an arrangement of this character being disclosed in my aforementioned Patent No. 2,472,334.

When, in order to actuate the additional control device, the handle 25 is turned in clockwise direction to rock bell-crank 32 and thereby depress rod 34 (plug 16 also being rotated through a small angle in this operation), upon release of the handle the same can rotate freely and return to its preceding position (as, under the force of spring 35 acting through the bell-crank) since the amount of lost-motion provided between the tips 21, 22 and the sides of the recesses 29, 30 at their lower ends is more than sufficient to permit the return of the handle without requirement for movement of the plug 16 which must fit relatively tightly in its tapered socket to avoid leakage.

When the plug is in its fully-open position, 90° from the position shown, there is a negligible amount of lost-motion between the handle and the plug since the tips 21, 22 are then at the narrow upper ends of the recesses 29, 30; the amount of lost motion also being small within the range of movement of the plug through which range it may be turned to throttle the flow.

Referring now to Figs. 5, 6 and 7 of the drawing: it is to be assumed that the structure of these figures includes the same arrangement of control devices (plug valve and safety shut-off valve) as were described in connection with the structure of Figs. 1-4; the difference between the structures lying in the means for providing a varying amount of lost-motion between the handle means and the plug-stem 18.

Secured to the top of the casing 11 and surrounding the plug-stem 18 is a hollow cylindrical member 41 having in its periphery a pair of circumferential grooves 42 and 43 which are shaped to receive the inner half of each of a pair of balls 44 and 45; the grooves being deepened at one of their respective ends to form cavities 46 and 47 for the balls; the balls, as seen in Figs. 5 and 6, being urged outwardly from these cavities by the force of light leaf springs 48 and 49 mounted in narrow horizontal slots in the member 41.

Fitting freely around the member 41 is an inverted cup 50, and around this cup is an outer inverted cup (or handle) 51; the inner cup 50 having in its side wall a pair of openings through which the outer portions of the balls 44, 45 project into recesses 52 and 53 formed in the side wall of the outer cup or handle 51.

Within the inner cup 50, and secured as by rivets 54 to the top wall of that cup, is a generally U-shaped strip 55 having in its enlarged central portion an opening conforming to the cross-sectional shape of the plug-stem 18 and receiving the same. The handle 51 is mounted on the cup 50 by a screw 56 which is shouldered to permit relative rotation between the handle and the cup, and is provided with a finger 31' which cooperates with bell-crank 32 in the same manner as does the finger 31 of handle 25 in the arrangement of Figs. 1-4.

When the handle 51 is turned in clockwise direction from the position shown in Figs. 5 and 6 to actuate the bell-crank 32, inasmuch as movement of the balls 44, 45 in that direction is prevented by the ends of the cavities 46, 47 in the stationary member 41, the balls are forced into those cavities by the handle; the parts assuming the positions shown in Fig. 7. Since rotation of the inner cup 50 was prevented by the balls when the handle was turned to the position of Fig. 7, rotation of the plug-stem 18 (connected to cup 50 by the U-shaped strip 55) likewise was prevented.

When the handle is in the position shown in Fig. 7 it is out of driving connection with the plug-stem, and its freedom of rotation is affected only slightly by the pressure of the balls 44, 45 since the springs 48, 49 need be only sufficiently stiff to ensure ejection of the balls from the cavities 46, 47 when the handle is returned to the position shown in Figs. 5 and 6 upon completion of actuation of the additional control device.

When, to open the plug valve, the handle is turned in counterclockwise direction from the position of Figs. 5 and 6, the balls 44, 45 and the inner cup 50 remain in the same position relative to each other and to the handle as that shown in those figures, the balls running in the conforming grooves 42, 43; there being then virtually no lost-motion between the handle 51 and the plug-stem.

The structure shown in Figs. 8 and 9 differs from that of Figs. 5-7 only in the manner of connecting the top part or handle 61 to the inner member 62, and, in turn, connecting that member to the plug-stem. The handle 61 has in its top a pair of arcuate slots 63 through which screws 64 extend into threaded openings in the top wall of the inner member, whose central portion 65 is depressed and apertured to fit the plug-stem in the same manner as does the U-shaped strip 55 in the arrangement of Figs. 5-7.

The handle 61 has an actuating finger 31'' corresponding to the finger 31 of handle 25, and to finger 31' of handle 51.

The structure of Figs. 8 and 9 includes the same arrangement of balls, grooves and recesses as does the structure of Figs. 5-7, and its operation is the same as was described in connection with those figures; the extent of the slots 63 being more than sufficient to permit the required relative movement between the handle 61 and the inner member 62 when the handle is rotated (to a position corresponding to that of Fig. 7) to actuate the additional control device.

The specific structures herein shown and described are intended merely as illustrative of arrangements suitable for practicing my invention, the scope of which is defined in the appended claims.

I claim as my invention:

1. In a control structure: a valve comprising an apertured plug rotatable between open and closed positions; an additional control member; handle means for manually rotating said plug and, when the plug is in a given flow-controlling position, rotatable to actuate said additional control member; a lost-motion connection between said handle means and said plug permitting relative rotation between the handle means and the plug in an amount such that, following actuation of the additional control member by the handle means, the handle means can be returned to its preceding position without effecting rotation of the plug; and means cooperating with said lost-motion connection and operated by rotation of the handle means relative to the structure for automatically reducing the amount of relative rotation which can occur between the handle means and the plug when the plug is in positions other than said given position and the handle means is rotated in either direction.

2. In a control structure: a valve comprising an apertured plug rotatable between open and closed positions; an additional control member biased to one controlling position; handle means for manually rotating said plug and, when the plug is in a given flow-controlling position, rotatable to actuate said additional control member to another controlling position against the force of its bias; a lost-motion connection between said handle means and said plug permitting relative rotation between the handle means and the plug in an amount such that, following actuation of the additional control member by the handle means, the handle means can be returned to its preceding position without effecting rotation of the plug; and means cooperating with said lost-motion connection and operated by rotation of the handle means relative to the structure for automatically reducing the amount of relative rotation which can occur between the handle means and the plug when the plug is in positions other than said given position and the handle means is rotated in either direction.

3. In a control structure: a valve comprising an apertured plug rotatable between open and closed positions; an additional control member biased to one controlling position; handle means for manually rotating said plug and adapted, by continued rotation after the plug has been brought by the handle means to a given flow-controlling position, to engage said additional control member and actuate it to another controlling position against the force of its bias; a lost-motion connection between said handle means and said plug permitting relative rotation between the handle means and the plug in an amount such that, following actuation of the additional control member by the handle means, the handle means can be returned to its preceding position without effecting rotation of the plug; and means cooperating with said lost-motion connection and operated by rotation of the handle means relative to the structure for automatically reducing the amount of relative rotation which can occur between the handle means and the plug when the plug is in positions other than said given position and the handle means is rotated in either direction.

4. In a control structure: a valve comprising an apertured plug rotatable between open and closed positions; an additional control member biased to one controlling position; handle means for manually rotating said plug and, when the plug is in a given flow-controlling position, rotatabe to actuate said additional control member to another controlling position against the force of its bias; and a lost-motion connection between said handle means and said plug so constructed and arranged as to permit, when the handle means is rotated in either direction, a substantial amount of relative rotation between the handle means and the plug when the plug is in said given position and relatively smaller amount when the plug is in other positions.

5. In a control structure: a valve comprising an apertured plug rotatable between open and closed positions; an additional control member biased to one controlling position; handle means for manually rotating said plug and adapted, by continued rotation after the plug has been brought by the handle means to a given flow-controlling position, to engage said additional control member and actuate it to another controlling position against the force of its bias; and a lost-motion connection between said handle means and said plug so constructed and arranged as to permit, when the handle means is rotated in either direction, a substantial amount of relative rotation between the handle means and the plug when the plug is in said given position and relatively smaller amount when the plug is in other positions.

6. In a control structure: a valve comprising an apertured plug rotatable between open and closed positions; an additional control member biased to one controlling position; handle means for manually rotating said plug and adapted, by continued rotation after the plug has been brought by the handle means to a given flow-controlling position, to engage said additional control member and actuate it to another controlling position against the force of its bias; and a lost-motion connection between said handle means and said plug so constructed and arranged as to permit, when the handle means is rotated in either direction, relative rotation between the handle means and the plug the amount of which varies according to the angular position of the plug and is maximum when the plug is in said given flow-controlling position.

7. In a control structure: a valve comprising an apertured plug rotatable between open and closed positions; an additional control member biased to one controlling position; handle means for manually rotating said plug and adapted, by continued rotation after the plug has been brought by the handle means to a given flow-controlling position, to engage said additional control member and actuate it to another controlling position against the force of its bias; and a lost-motion connection between said handle means and said plug so constructed and arranged as to permit, only when the plug is in said given flow-controlling position, substantial relative rotation between the handle means and the plug when the handle means is rotated in either direction.

WILLIAM A. RAY.

References Cited in the file of this patent
UNITED STATES PATENTS

| Number | Name | Date |
|---|---|---|
| 2,447,668 | Ray | Aug. 24, 1948 |